United States Patent
Tang

(10) Patent No.: US 7,577,112 B2
(45) Date of Patent: Aug. 18, 2009

(54) METHOD FOR TRANSMITTING INFORMATION OF A MOBILE STATION THROUGH A WLAN

(75) Inventor: Cheng-Wen Tang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 457 days.

(21) Appl. No.: 11/308,585

(22) Filed: Apr. 10, 2006

(65) Prior Publication Data

US 2007/0076656 A1    Apr. 5, 2007

(30) Foreign Application Priority Data

Sep. 30, 2005    (CN) .................... 2005 1 0100090

(51) Int. Cl.
*H04Q 7/00* (2006.01)
(52) U.S. Cl. .................... 370/310; 370/328; 370/338; 370/329
(58) Field of Classification Search ... 455/422.1–426.2, 455/517–525, 41.2; 370/310–350, 401; 713/150; 709/221, 224–225
See application file for complete search history.

(56) References Cited

U.S. PATENT DOCUMENTS

| | | | |
|---|---|---|---|
| 6,873,851 B2 | 3/2005 | Brown et al. | |
| 7,251,685 B1 * | 7/2007 | Yildiz | 709/221 |
| 7,391,774 B2 * | 6/2008 | Lim et al. | 370/338 |
| 2004/0013128 A1 * | 1/2004 | Moreton et al. | 370/447 |
| 2004/0105449 A1 * | 6/2004 | Jung et al. | 370/401 |
| 2005/0086465 A1 * | 4/2005 | Sapkota et al. | 713/150 |
| 2006/0030290 A1 * | 2/2006 | Rudolf et al. | 455/404.1 |
| 2006/0142034 A1 * | 6/2006 | Wentink et al. | 455/515 |
| 2006/0191000 A1 * | 8/2006 | O'Hara et al. | 726/12 |

* cited by examiner

*Primary Examiner*—Kamran Afshar
(74) *Attorney, Agent, or Firm*—Wei Te Chung

(57) ABSTRACT

A method for transmitting information of a mobile station through a wireless local area network (WLAN) is provided. The WLAN includes a plurality of access points and a plurality of mobile stations, and is coupled to a management server. One mobile station communicates with one of the access points by management frames, and the access point communicates with the management server by packets. The method includes the steps of: adding an information element (IE) for storing information of the mobile station to a management frame by the mobile station; transmitting the management frame with the IE from the mobile station to the access point; adding content of the IE to a packet by the access point; and transmitting the packet from the access point to the management server.

18 Claims, 6 Drawing Sheets

METHOD FOR TRANSMITTING INFORMATION OF A MOBILE STATION THROUGH A WLAN

FIELD OF THE INVENTION

The invention relates to communication methods in a wireless local area network (WLAN), and particularly to a method for transmitting information of a mobile station through a WLAN.

DESCRIPTION OF RELATED ART

Due to rapid developments of wireless local area networks (WLANs), various mobile stations, for example, mobile phones, notebook computers, personal digital assistants (PDAs), and the like, can obtain Internet services via wireless network interfaces thereof. The mobile stations transmit data to or receive data from the wired local area network via access points (APs). Each AP communicates with a management server (MS). The management server manages the whole network including the WLAN and the wired local area network, and people functioning as network managers can know information of each mobile station via the management server.

Standards for WLANs are found in the Institute of Electrical and Electronics Engineers (IEEE) 802.11. Included are specifications of a physical layer and a media access control (MAC) layer. The IEEE 802.11 adds a new header to an original header of a packet of the wired local area network, and the transport protocols of the WLAN, such as the transport control protocol (TCP) and the Internet protocol (IP), are the same as those of the wired local area network. Therefore, it is very easy for higher layers of the wired local area network, namely the network layer, the transport layer, and the application layer, to process packets.

In a conventional method for transmitting information of mobile stations through the WLAN, the mobile stations transmit MAC frames containing relevant information of the mobile stations to the management server via the APs. Employing the conventional method, the format of the MAC frames needs redefinition. In addition, in the communication process, the MAC frames must employ the same security settings such as a wired equivalent privacy (WEP), a Wi-Fi protected access (WPA), a pre-share key (PSK). Furthermore, it needs more network bands to transmit the MAC frames with the relevant information of the mobile stations, so the transport loadings of the WLAN are aggravated.

SUMMARY OF INVENTION

A method for transmitting information of a mobile station through a wireless local area network (WLAN) is provided. The WLAN includes a plurality of access points (APs) and a plurality of mobile stations, and is coupled to a management server. One of the mobile stations communicates with one of the access points by management frames, and the access point communicates with the management server by packets. The method includes the steps of: adding an information element (IE) for storing information of the mobile station to a management frame by the mobile station; transmitting the management frame with the IE from the mobile station to the access point; adding content of the IE to a packet by the access point; and transmitting the packet from the access point to the management server.

Other advantages and novel features will become more apparent from the following detailed description when taken in conjunction with the accompanying drawings, in which:

DETAILED DESCRIPTION

Figure 1:
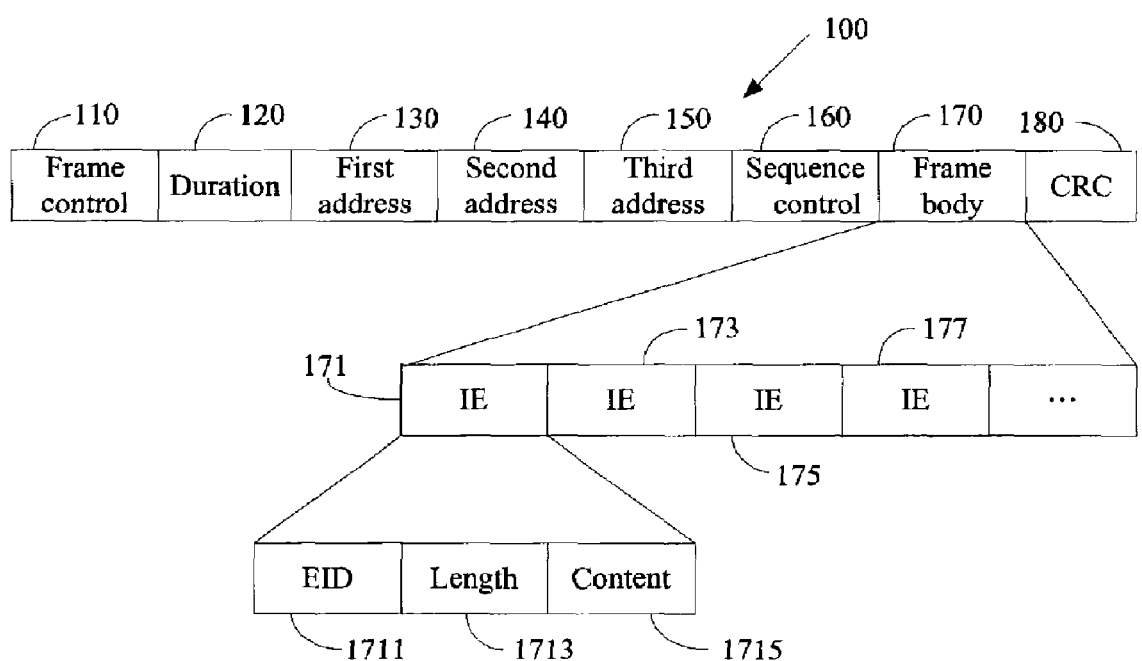
FIG. 1 is a schematic diagram of a format of an IEEE 802.11 management frame.

FIG. 1 is a schematic diagram of a format of an IEEE 802.11 management frame 100. The IEEE 802.11 management frame 100 (hereinafter "the management frame 100") includes authentication frames, deauthentication frames, association request frames, association response frames, reassociation request frames, reassociation response frames, and disassociation frames, and the like. The management frame 100 includes the fields of a frame control field 110, a duration field 120, a first address field 130, a second address field 140, a third address field 150, a sequence control field 160, a frame body field 170, and a cyclic redundancy check (CRC) field 180. The frame body field 170 includes a plurality of information elements (IEs) 171, 173, 175, 177, etc. Each IE includes three fields. In the exemplary embodiment, for example, the IE 171 includes an element identifier (EID) 1711, a length field 1713, and a content field 1715. Currently, the IEEE 802.11 does not utilize all IEs of a frame body field 170, so some of the IEs 171, 173, 175, 177 are idle. In the exemplary embodiment of the invention, one of the IEs such as the IE 171 can be used to store information of a mobile station 10 (see FIG. 2).

Figure 2:
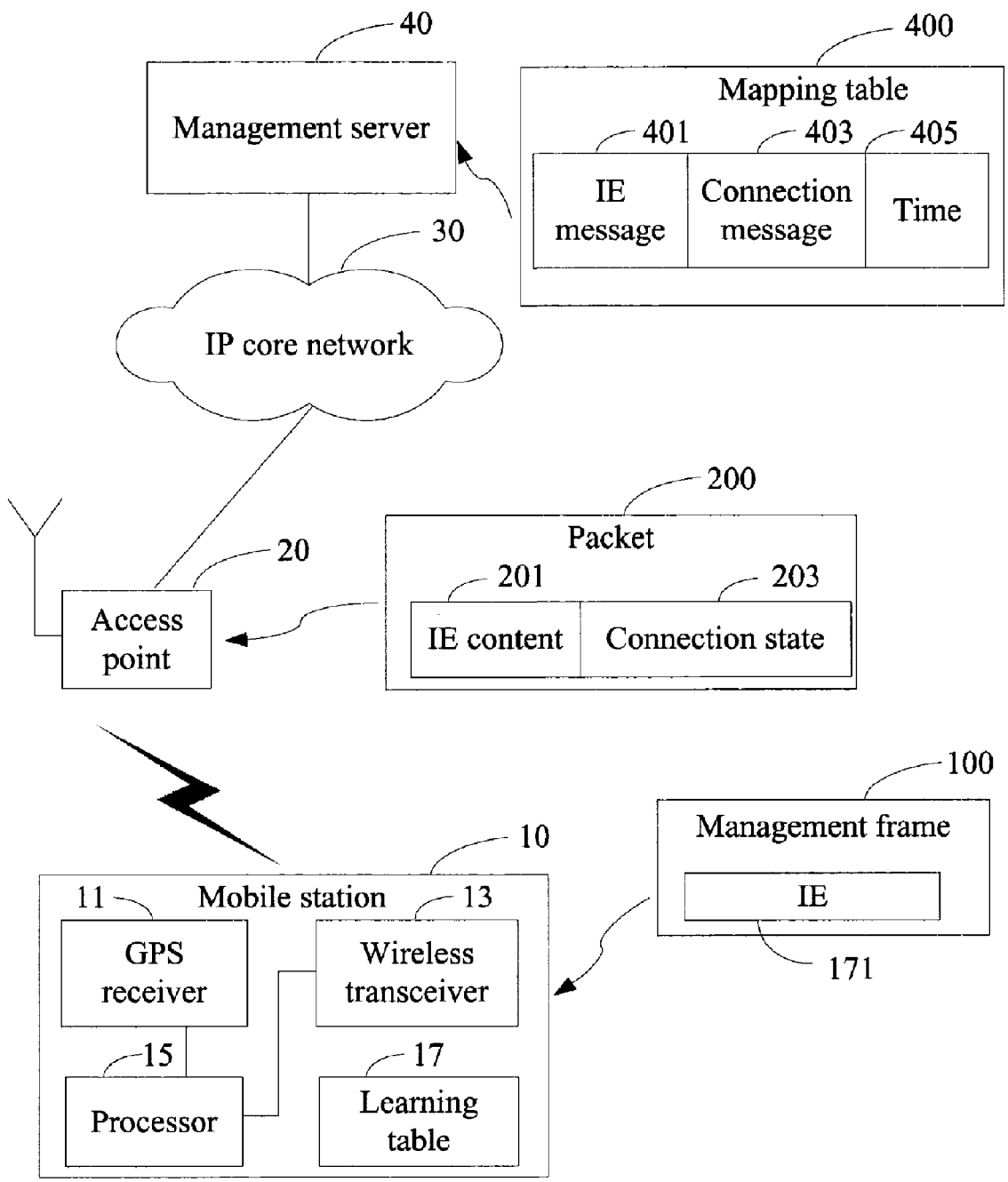
FIG. 2 is a schematic diagram of an application environment of a method for transmitting information of a mobile station through a wireless local area network of an exemplary embodiment of the present invention.

FIG. 2 is a schematic diagram of an application environment of a method for transmitting information of the mobile station 10 through a wireless local area network (WLAN) of an exemplary embodiment of the present invention. In the exemplary embodiment, the WLAN includes a plurality of access points 20 (only one shown) and a plurality of mobile stations 10 (only one shown). The WLAN is connected to a management server 40 via an Internet protocol (IP) core network 30. The mobile stations 10 can be connected to the WLAN via WLAN interfaces.

In the exemplary embodiment, the mobile stations 10 may be notebook computers, mobile telephones, or personal digital assistants (PDAs), etc. The mobile station 10 communicates with the access point 20 by using the management frames 100. The access point 20 communicates with the management server 40 by using packets 200 via the IP core network 30. The access point 20 transmits data between the WLAN and the IP core network 30. The management server 40 manages the WLAN and the IP core network 30, and network managers can know information of the mobile station 10 via the management server 40.

A method for transmitting relevant information of the mobile station 10 is provided. In the exemplary embodiment, the relevant information of the mobile station 10 includes location information. The mobile station 10 includes a global positioning system (GPS) receiver 11, a wireless transceiver 13, and a processor 15. The GPS receiver 11 receives location information of the mobile station 10 from a satellite (not shown), and transmits the location information to the processor 15. The processor 15 translates the location information to 6 bits string corresponding to a latitude and longitude of the mobile station 10, and transmits the translated location information to the wireless transceiver 13. In the exemplary embodiment, the wireless transceiver 13 may be a wireless network card.

The wireless transceiver 13 of the mobile station 10 establishes a virtual network connection with the access point 20 via the management frame 100. In the exemplary embodiment, the IE 171 of the management frame 100 stores the translated location information of the mobile station 10. In other embodiments, the IE 171 may store other relevant information of the mobile station 10 such as energy information and normal working time information of the mobile station 10. The access point 20 communicates with the management server 40 by using the packet 200. The access point 20 adds the content of the IE 171 to the packet 200. In the exemplary embodiment, the packet 200 includes an IE content field 201 and a connection state field 203. The IE content field 201 stores the content of the IE 171 of the management frame 100. The connection state field 203 stores connection state information between the mobile station 10 and the access point 20, namely, information whether the mobile station 10 is within the operating scope of the access point 20.

The management server 40 includes a mapping table 400, and the mapping table 400 includes an IE message field 401, a connection message field 403, and a time field 405. In the exemplary embodiment, the IE message field 401 stores the translated location information of the mobile station 10 in the packet 200. That is, the IE message field 401 is used for storing the content of the IE 171 of the packet 200. The connection message field 403 stores the connection state information of the mobile station 10 in the packet 200. The time field 405 stores the time the management server 40 received the packet 200.

In the exemplary embodiment, after receiving the management frame 100 transmitted by the wireless transceiver 13, the access point 20 translates the management frame 100, and adds the content of the IE 171 and the connection state information of the mobile station 10 to the IE content field 201 and the connection state field 203 to form the packet 200, respectively. The method for determining the connection state of the mobile station 10 is described hereinafter. The access point 20 transmits the packet 200 with the content of the IE 171 to the management server 40 via the IP core network 30. The management server 40 translates the packet 200, and stores the content of the IE 171 and the connection state information of the mobile station 10 in the IE message field 401 and the connection message field 403 of the mapping table 400, respectively. The time for the management server 40 to receive the packet 200 is stored in the time field 405. Consequently, the network managers can know the translated location information of the mobile station 10 at a certain time via the mapping table 400.

In other embodiments, the mobile station 10 may further include a learning table 17. The learning table 17 records a result of whether each access point 20 communicating with the mobile station 10 supports the management frame 100 with the IE 171.

Figure 3:
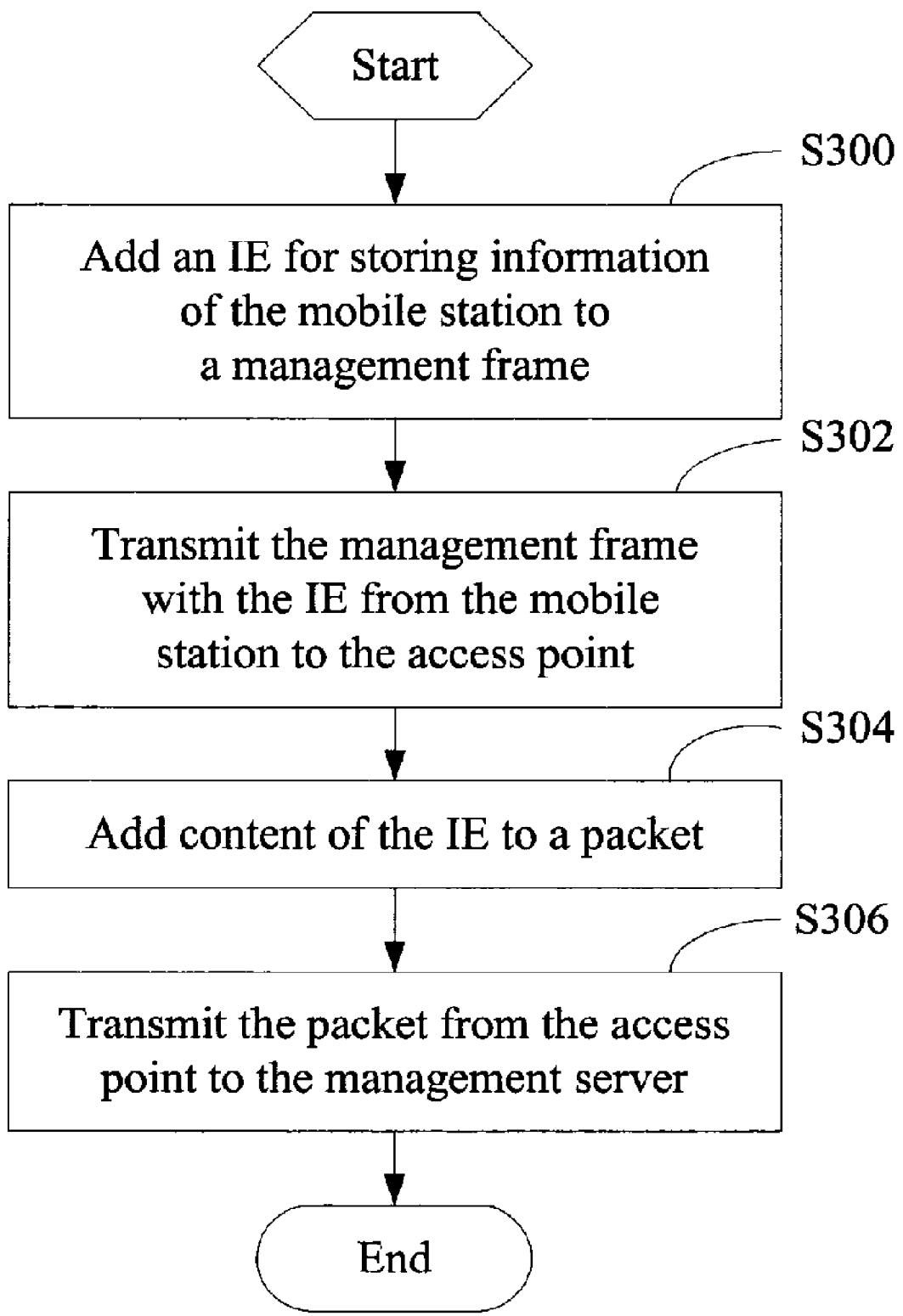
FIG. 3 is a flowchart of a method of transmitting information of a mobile station through a wireless local area network of an exemplary embodiment of the present invention.

FIG. 3 is a flowchart of a method of transmitting information of the mobile station 10 through the WLAN of an exemplary embodiment of the present invention. In the exemplary embodiment, a method of transmitting information of the mobile station 10 through a WLAN is provided as follows.

In step S300, the mobile station 10 adds an IE 171 for storing information of the mobile station 10 to a management frame 100. In step S302, the mobile station 10 transmits the management frame 100 with the IE 171 to the access point 20. In step S304, the access point 20 adds content of the IE 171 to a packet 200. In step S306, the access point 20 transmits the packet 200 to the management server 40. As a result, network managers can know the information of the mobile station 10 via the management server 40.

Figure 4:
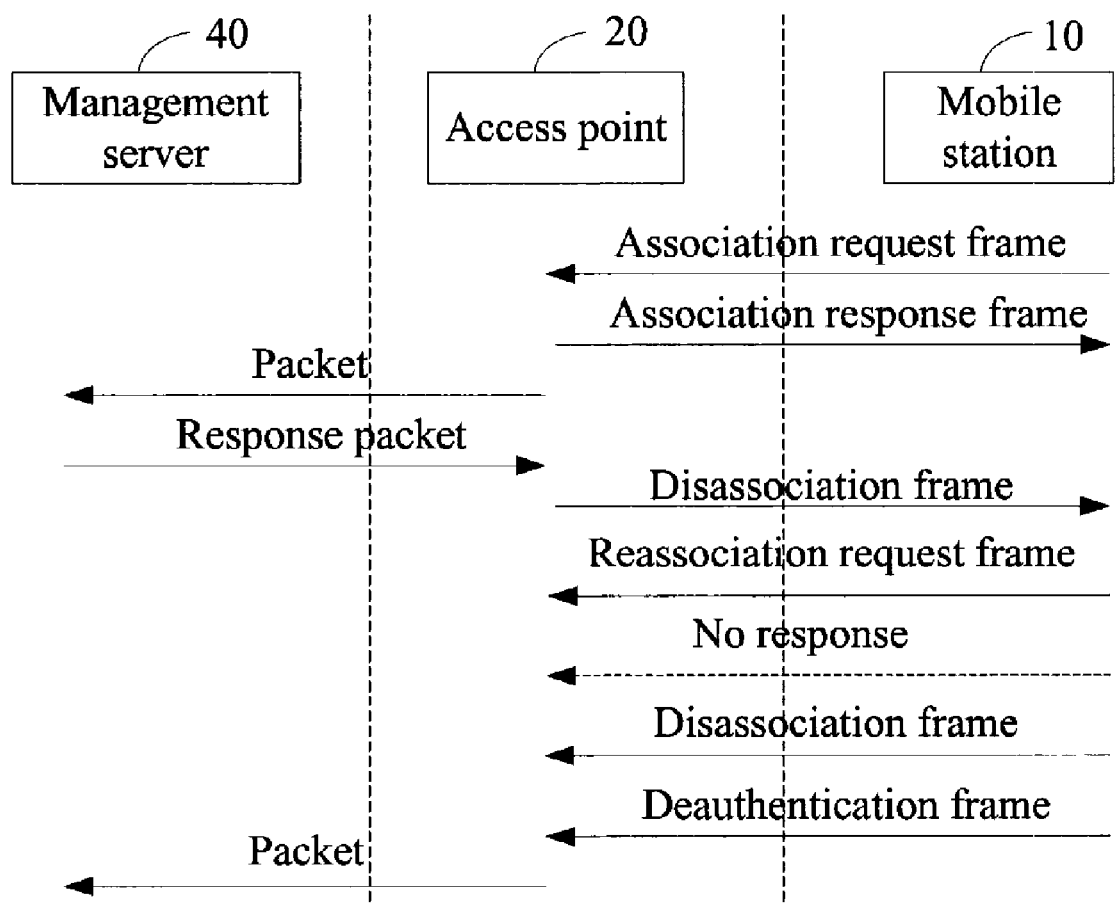
FIG. 4 is a transport diagram of a method for transmitting information of a mobile station through a wireless local area network of an exemplary embodiment of the present invention.

FIG. 4 is a transport diagram of a method for transmitting information of the mobile station 10 through the WLAN of another exemplary embodiment of the present invention. Initially, the mobile station 10 transmits a management frame 100 to the access point 20 to request a connection. In the exemplary embodiment, the management frame 100 is an association request frame. The association request frame 100 includes the IE 171 storing information of the mobile station 10. If the access point 20 accepts the connection request, the access point 20 transmits an association response frame to the mobile station 10. Since not all access points 20 in the WLAN support the management frame 100 with the IE 171, some access points 20 not supporting the management frame 100 with the IE 171 cannot transmit the content of the IE 171 to the management server 40. In the exemplary embodiment, the mobile station 10 establishes the learning table 17 (see FIG. 2) to resolve the above problem. The mobile station 10 can determine whether the access point 20 supports the management frame 100 with the IE 171 according to the association response frame, the determination details will be described hereinafter in FIG. 5. If the access point 20 supports the management frame 100 with the IE 171, the mobile station 10 successfully transmits the management frame 100 with the IE 171 to the access point 20. If the access point 20 does not support the management frame 100 with the IE 171, the mobile station 10 stops transmitting the management frame 100 with the IE 171 to the access point 20.

If the access point 20 supports the management frame 100 with the IE 171, the access point 20 respectively adds the content of the IE 171 and the connection state information of the mobile station 10 to the IE content field 201 and the connection state field 203 of the packet 200, and then transmits the packet 200 to the management server 40. After receiving the packet 200, the management server 40 stores information from the IE content field 201, the connection state field 203, and the current time, respectively in the IE message field 401, the connection message field 403, and the time field 405. Thus, it is convenient for network managers to know the location information of the mobile station 10 at a certain time via the mapping table 400.

As shown in FIG. 4, after receiving a packet 200, the management server 40 transmits a response packet to the access point 20, to ask the access point 20 to transmit information of the mobile station 10 again after a predetermined time. In the exemplary embodiment, the predetermined time ranges from 10 to 15 minutes. The access point 20 receives the response packet and determines the connection state of the mobile station 10 in the predetermined time. The determination of the connection state of the mobile station 10 is as follows. In the exemplary embodiment, at first, the access point 20 transmits a disassociation frame to the mobile station 10. Then, if the mobile station 10 is in a positive connection state, the mobile station 10 will send back a reassociation request frame 100. The reassociation request frame 100 also includes the IE 171 storing current location information of the mobile station 10. The access point 20 determines that the mobile station 10 is in a positive connection state after receiving the reassociation request frame 100. If the mobile station 10 is in a disconnection state, the access point 20 will receive no response from the mobile station 10, and determines that the mobile station 10 is in a disconnection state. If the access point 20 receives a disassociation frame or a deauthentication frame from the mobile station 10, the access point 20 determines that the mobile station 10 is in a disconnection state. The details of the method for determining the connection state of the access point 10 by the access point 20 will be described in FIG. 6.

If the mobile station 10 is in a positive connection state, and transmits the reassociation request frame 100 to the access point 20, the access point 20 adds the current connection state information of the mobile station 10 and the content of the IE 171 to another packet 200, and then transmits the packet 200 to the management server 40.

Figure 5:
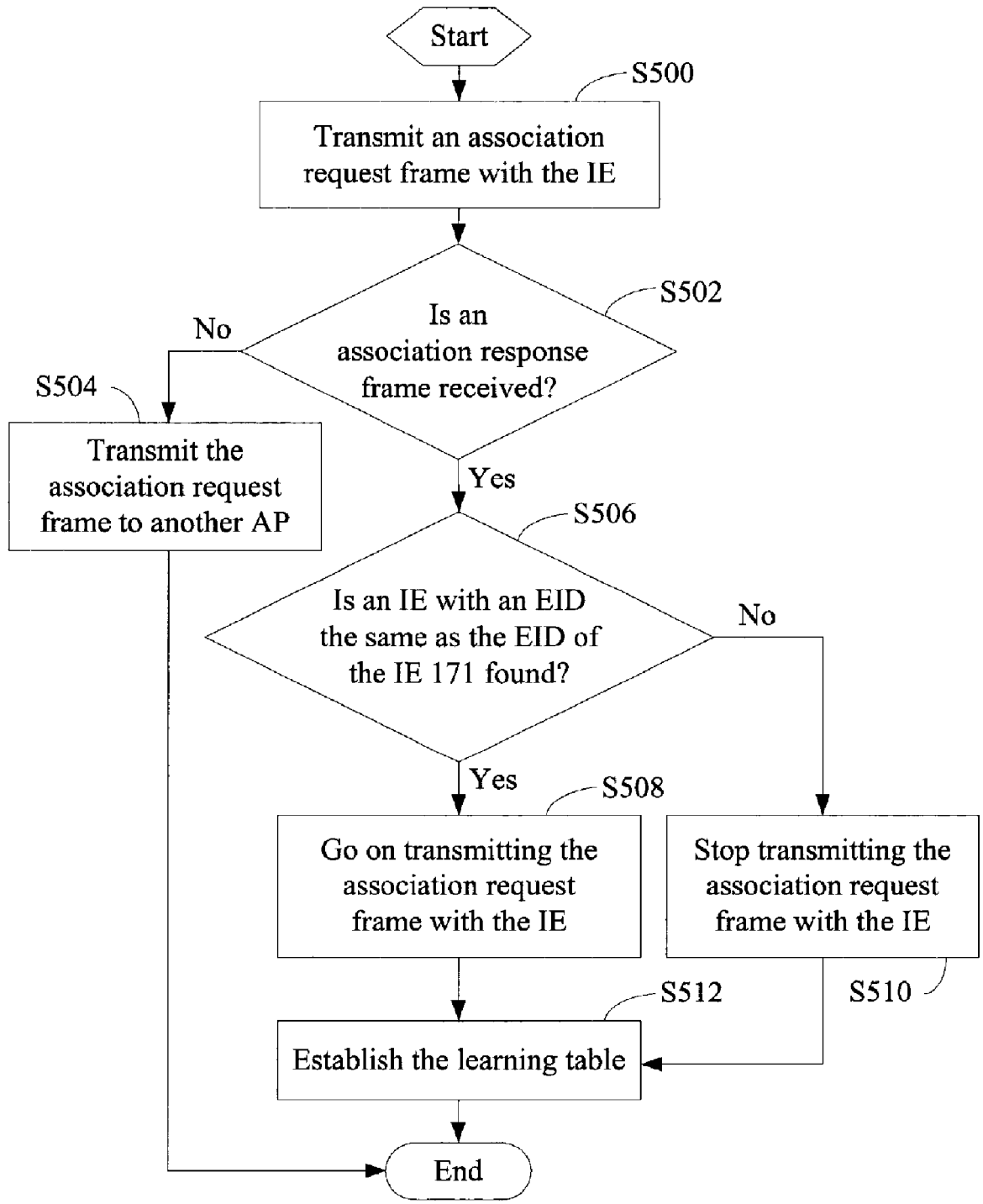
FIG. 5 is a flowchart of a method for establishing a learning table of an exemplary embodiment of the present invention.

FIG. 5 is a flowchart of a method for establishing the learning table 17 of an exemplary embodiment of the present invention. In the exemplary embodiment, when the mobile station 10 transmits the management frame 100 with the IE 171 to the access point 20, the mobile station 10 establishes the learning table 17.

As mentioned above, IEEE 802.11 defines that each IE in the management frame includes an EID. As shown in FIG. 1, the IE 171 includes the EID 1711. In step S500, the mobile station 10 transmits an association request frame 100 with the IE 171 to the access point 20.

In step S502, the mobile station 10 determines whether an association response frame is received from the access point 20.

If no association response frame is received from the access point 20, in step S504, the mobile station 10 transmits the association request frame 100 with the IE 171 to another access point 20.

If an association response frame is received from the access point 20, in step S506, the mobile station 10 determines whether an IE with an EID, the same as the EID 1711 of the IE 171, is found in the association response frame.

If an IE with an EID the same as the EID 1711 is found, in step S508, the mobile station 10 goes on transmitting the association request frame 100 with the IE 171 to the access point 20.

If no IE with an EID the same as the EID 1711 is found, in step S510, the mobile station 10 stops transmitting the association request frame 100 with the IE 171 to the access point 20.

In step S512, the mobile station 10 establishes the learning table 17 for recording a result of whether each access point 20 communicating with the mobile station 10 supports the association request frame 100 with the IE 171. When an IE with an EID the same as the EID 1711 is found in the association response frame 100, the mobile station 10 records a positive support result for the access point 20. When no IE with an EID the same as the EID 1711 is found, the mobile station 10 records a negative support result for the access point 20. When the mobile station 10 records a negative support result for the access point 20, the mobile station 10 transmits the association request frame 100 with the IE 171 to another access point 20.

Figure 6:
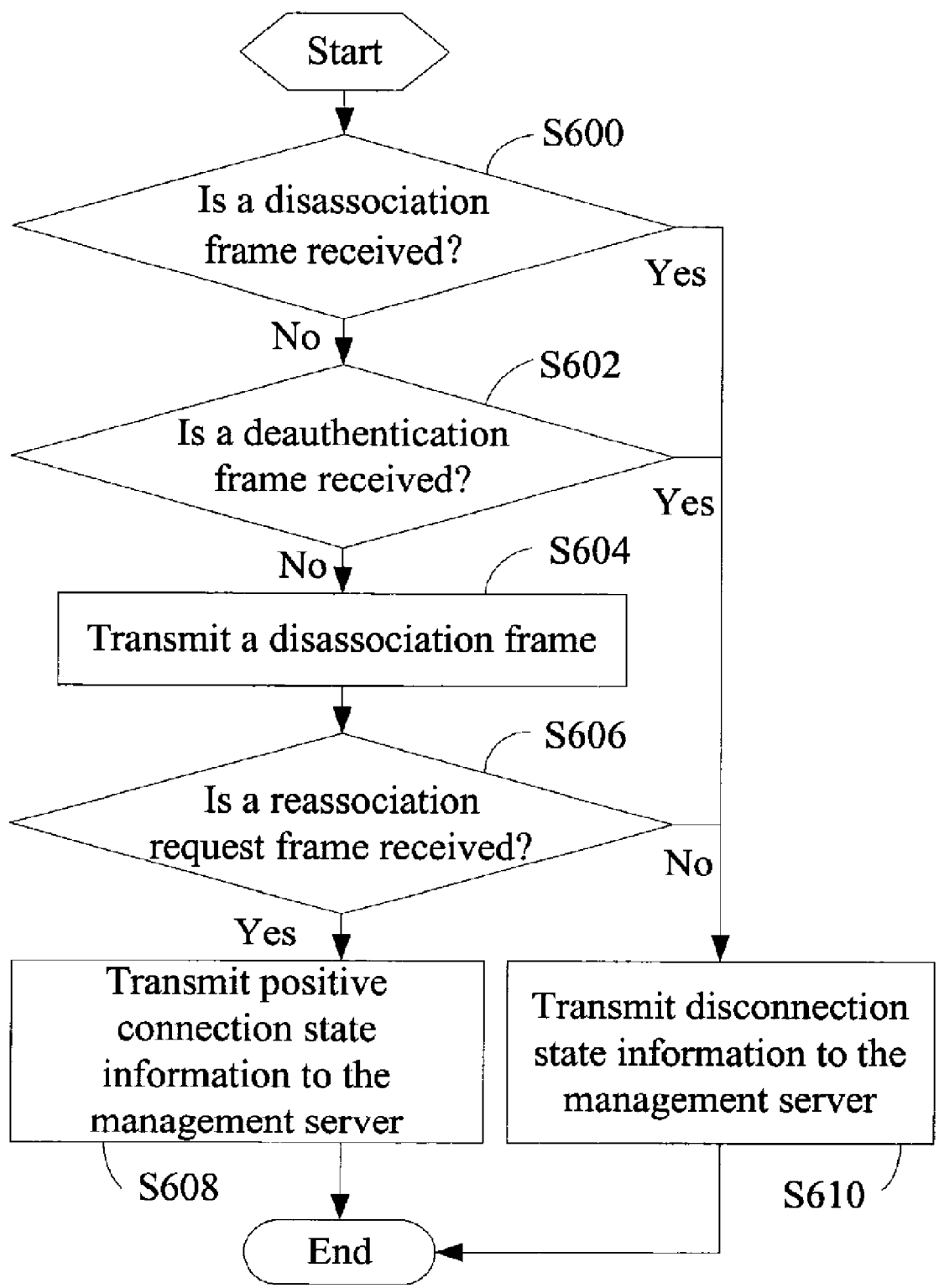
FIG. 6 is a flowchart of a method for determining a connection state of a mobile station of an exemplary embodiment of the present invention.

FIG. 6 is a flowchart of the method for determining a connection state of the mobile station 10 of an exemplary embodiment of the present invention. In the exemplary embodiment, the connection state of the mobile station 10 is determined by the access point 20.

In step S600, the access point 20 determines whether a disassociation frame is received from the mobile station 10. If a disassociation frame is received, the access point 20 determines that the mobile station 10 is in a disconnection state. In such case, in step S610, the access point 20 transmits disconnection state information to the management server 40.

If no disassociation frame is received, in step S602, the access point 20 determines whether a deauthentication frame is received from the mobile station 10. If a deauthentication frame is received, the access point 20 determines that the mobile station 10 is in a disconnection state. In such case, in step S610, the access point 20 transmits disconnection state information to the management server 40.

If no deauthentication frame is received, in step S604, the access point 20 transmits a disassociation frame to the mobile station 10.

In step S606, the access point 20 determines whether a reassociation request frame is received from the mobile station 10. If so, in step S608, the access point 20 transmits positive connection state information to the management server 40. Otherwise, in step S610, the access point 20 transmits disconnection state information to the management server 40. In the exemplary embodiment, the access point 10 adds the positive connection state information or the disconnection state information to a packet 200, and then transmits the packet 200 to the management server 40.

The invention does not limit the sequence of the above steps. In other embodiments, the sequence of the steps S600, S602 and S604 can be exchanged with the steps S606 and S608.

In the method for transmitting information of the mobile station 10 through the WLAN of the exemplary embodiment of the present invention, the IE 171 for storing information of the mobile station 10 is added to the management frame 100. The access point 20 can acquire the IE 171 by receiving the management frame 100, and then the access point 20 transmits the packet 200 including content of the IE 171 to the management server 40. In this way, network managers can know the information of the mobile station 10.

The management frame 100 defined by IEEE 802.11 does not require security settings of a wired equivalent privacy (WEP), a Wi-Fi protected access (WPA), a pre-share key (PSK). In addition, the IE 171 is added to the management frame 100, so the management frame 100 does not need redefinition, and so fewer network bands are needed. Furthermore, the management frame 100 is transmitted at a basic transmit rate, so a transmitting distance thereof is greater. Therefore, it is convenient for the information of the mobile station to be transmitted through a WLAN.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A method for transmitting information of a mobile station through a wireless local area network (WLAN), the WLAN comprising a plurality of access points and a plurality of mobile stations, the WLAN coupled to a management server, one of the mobile stations communicating with one of the access points by management frames, the access point communicating with the management server by packets, the method comprising the steps of:

adding an information element (IE) for storing information of the mobile station to a management frame by the mobile station;

transmitting the management frame with the IE from the mobile station to the access point; and adding content of the IE to a packet by the access point, wherein the packet comprises a connection state field for storing connection state information of the mobile station; and transmitting the packet from the access point to the management server.

2. The method as claimed in claim 1, wherein the IE stores location information of the mobile station.

3. The method as claimed in claim 1, wherein the IE stores energy information of the mobile station.

4. The method as claimed in claim 1, wherein the IE stores normal working time information of the mobile station.

5. The method as claimed in claim 1, wherein the management server comprises a mapping table.

6. The method as claimed in claim 5, wherein the mapping table comprises an IE message field for storing the information of the mobile station in the packet, a connection message field for storing the connection state information of the mobile station in the packet, and a time field for storing the time the management server received the packet.

7. The method as claimed in claim 1, wherein the management frames comprise association request frames, association response frames, reassociation request frames, reassociation response frames, disassociation frames, and deauthentication frames.

8. The method as claim in claim 1, wherein the mobile station comprises a learning table for recording a result of whether each access point communicating with the mobile station supports the management frame with the IE.

9. The method as claimed in claim 1, wherein the IE comprises an element identifier (EID).

10. The method as claimed in claim 9, wherein the step of transmitting the management frame from the mobile station to the access point comprises the steps of:

transmitting an association request frame with to IE from the mobile station to the access point, wherein the association request frame belongs to the management frames;

determining whether an association response frame is received by the mobile station, wherein the association response frame belongs to the management frames;

determining whether an IE with an EID the same as the EID of the added IE is found in the association response frame, if the association response frame is received; and transmitting the association response frame to the access point, and recording a positive support result for the access point, if an IE with an EID the same as the EID of the added IE is found.

11. The method as claimed in claim 10, wherein the step of transmitting the management frame from the mobile station to the access point further comprises the step of:

transmitting the association request frame with the IE to another one of the access points, if no association response is received.

12. The method as claimed in claim 10, wherein the step of transmitting the management frame from the mobile station to the access point further comprises the step of:

transmitting the association request frame with the IE to another one of the access points, and recording a negative support result for the access point, if no IE with an EID the same as the EID of the added IE is found.

13. The method as claimed in claim 1, further comprising the step of:

transmitting a response packet to the access point by the management server, to ask the access point to transmit information of the mobile station again after a predetermined time, after the management server receives the packet.

14. The method as claimed in claim 13, further comprising the step of:

determining a connection state of the mobile station.

15. The method as claimed in claim 14, wherein the step of determining the connection state of the mobile station comprises the steps of:

transmitting a disassociation frame from the access point to the mobile station, wherein the disassociation frame belongs to the management frames;

determining whether a reassociation frame is received from the mobile station by the access point, wherein the reassociation frame belongs to the management frames; and determining that the mobile station is in a positive connection state, if the reassociation frame is received by the access point.

16. The method as claimed in claim 15, wherein the step of determining the connection state of the mobile station further comprises the step of:

determining that the mobile station is in a disconnection state, if no reassociation frame is received.

17. The method as claimed in claim 14, wherein the step of determining the connection state of the mobile station comprises the steps of:

determining that the mobile station is in a disconnection state, if receiving a disassociation frame from the mobile station by the access point in the predetermined time.

18. The method as claimed in claim 14, wherein the step of determining the connection state of the mobile station comprises the step of:

determining that the mobile station is in a disconnection state, if receiving a deauthentication frame from the mobile station by the access point in the predetermined time.

* * * * *